United States Patent
Christoffersen et al.

(10) Patent No.: US 9,587,623 B2
(45) Date of Patent: Mar. 7, 2017

(54) WIND TURBINES

(71) Applicant: Vestas Wind Systems A/S, Aarhus N. (DK)

(72) Inventors: Leif Christoffersen, Vejle (DK); Torben Friis Baun, Hornslet (DK); Jesper Lykkegaard Neubauer, Hornslet (DK)

(73) Assignee: Vestas Wind Systems A/S, Aarhus N. (DK)

( * ) Notice: Subject to any disclaimer, the term of this patent is extended or adjusted under 35 U.S.C. 154(b) by 321 days.

(21) Appl. No.: 14/406,981

(22) PCT Filed: May 1, 2013

(86) PCT No.: PCT/DK2013/050122
§ 371 (c)(1),
(2) Date: Dec. 10, 2014

(87) PCT Pub. No.: WO2013/185765
PCT Pub. Date: Dec. 19, 2013

(65) Prior Publication Data
US 2015/0110631 A1    Apr. 23, 2015

Related U.S. Application Data

(60) Provisional application No. 61/657,845, filed on Jun. 10, 2012.

(30) Foreign Application Priority Data

Jul. 2, 2012 (DK) .................................. 2012 70389

(51) Int. Cl.
*F03D 1/06* (2006.01)
*F03D 80/50* (2016.01)
(Continued)

(52) U.S. Cl.
CPC ......... *F03D 1/0658* (2013.01); *F03D 1/0691* (2013.01); *F03D 7/0224* (2013.01);
(Continued)

(58) Field of Classification Search
CPC ....... F03D 1/0658; F03D 1/0691; F03D 80/50
See application file for complete search history.

(56) References Cited

U.S. PATENT DOCUMENTS

| 7,244,102 B2 * | 7/2007 | Delucis ................. F03D 1/0658 |
| | | 415/908 |
| 9,074,581 B2 * | 7/2015 | Bagepalli ............. F03D 1/0658 |
| 2010/0129216 A1 * | 5/2010 | Bagepalli ............... F03D 1/003 |
| | | 416/61 |

FOREIGN PATENT DOCUMENTS

| DE | 202004003521 U1 | 6/2004 |
| EP | 1930584 A2 | 6/2008 |
| WO | 2012069062 A1 | 5/2012 |

OTHER PUBLICATIONS

International Searching Authority, International Search Report and Written Opinion, issued in corresponding International Application No. PCT/DK2013/050122, 11 pages, dated Aug. 21, 2013.
(Continued)

*Primary Examiner* — Nathaniel Wiehe
*Assistant Examiner* — Topaz L Elliott
(74) *Attorney, Agent, or Firm* — Wood Herron & Evans LLP

(57) ABSTRACT

A wind turbine is described which comprises a tower, a nacelle mounted to the top of the tower, and a rotor mounted to the nacelle. The rotor comprises two or more blades mounted to a central hub. The hub supports two or more annular pitch bearings associated respectively with the two or more blades. Each pitch bearing defines a bearing plane inclined at a first angle with respect to a horizontal plane when the respective blade is oriented in a downwardly
(Continued)

FIG. 3A direction in alignment with the tower. Each pitch bearing is spanned by a hub plate; and a work platform integral with or mounted to the hub plate lies generally in a plane at a second angle to the horizontal plane when the respective blade is oriented in a downwardly direction in alignment with the tower, which second angle is less than the first angle. The work platform provides a substantially horizontal platform for use by maintenance personnel when installing or servicing components in and around the hub.

15 Claims, 7 Drawing Sheets

(51) Int. Cl.
      *F03D 7/02*    (2006.01)
      *F03D 7/04*    (2006.01)

(52) U.S. Cl.
      CPC ............... *F03D 7/04* (2013.01); *F03D 80/00* (2016.05); *F03D 80/70* (2016.05); *F05B 2240/912* (2013.01); *F05B 2250/314* (2013.01); *Y02E 10/721* (2013.01)

(56) References Cited

OTHER PUBLICATIONS

Danish Patent and Trademark Office, Danish Search Report and Written Opinion issued in corresponding Danish Application No. PA 2012 70389, dated Nov. 2, 2012, 4 pages.
European Patent Office, Office Action in EP Application No. 13726097.2, Sep. 12, 2016.

* cited by examiner

WIND TURBINES

TECHNICAL FIELD

This invention relates to wind turbines.

BACKGROUND

A typical wind turbine 10 is shown schematically in FIG. 1 of the drawings. It comprises a tower 11, a nacelle 12 mounted to the top of the tower 11 and a rotor assembly 13 mounted to an upwind end 14 of the nacelle 12.

The rotor assembly 13 comprises blades 15 mounted on a central hollow hub 16. Typically there are three blades but there could be two blades or four or more blades. The blades 15 turn with the hub 16 in a rotor plane to drive a generator within the nacelle 12 to produce electricity.

The nacelle 12 can turn relative to the tower 11, the hub 16 can turn relative to the nacelle 12 and the blades 15 can turn relative to the hub 16. Specifically:

the nacelle 12 turns about a generally vertical yaw axis 17 with respect to the tower 11 to keep the rotor plane substantially orthogonal to the wind direction;

when driven by the wind, the rotor turns about a near-horizontal rotor axis 18 with respect to the nacelle 12; and to adjust their angle of attack, each blade 15 can be turned with respect to the hub 16 about a pitch axis 19 that extends radially from the rotor axis 18 along a centre line of the blade root 20, when viewed along the rotor axis 18.

As the blades 15 will bend in a downwind direction under wind forces, measures may be necessary to avoid any risk of the lowest blade of the rotor 13 striking the tower 11 in extremis. Firstly, the rotor axis 18 is typically set a few degrees above the horizontal 21. Secondly, the blades 15 commonly have a negative cone angle with respect to the hub 16 as shown, i.e. the blades 15 are inclined in a slightly upwind direction moving radially outward from the hub 16. The cone angle is exaggerated in FIG. 1, and in reality would typically only be a few degrees at most. Thus, whilst the pitch axis 19 extends radially from the rotor axis 18 when viewed along the rotor axis 18, the pitch axis 19 is not orthogonal to the rotor axis 18: the rotor plane is only approximately planar.

Various annular bearings enable the movements of the nacelle 12, the hub 16 and the blades 15. Specifically:

a yaw bearing between the tower 11 and the nacelle 12 lies in a substantially horizontal plane;

a rotor bearing between the hub 16 and the nacelle 12 lies in a near-vertical plane orthogonal to the rotor axis 18; and a pitch bearing between each blade root 20 and the hub 16 lies in a plane orthogonal to the pitch axis 19.

Typically, a generally circular hub plate extends across each blade bearing. The hub plates are primarily stiffening bulkheads of the hub 16 but may also serve as work platforms for technicians working within the stationary hub during installation and maintenance of the wind turbine. In particular, a hub plate may serve as a work platform when the blade 15 associated with that hub plate is parked to hang downwardly from the hub in alignment with the tower. A downwardly-hanging blade 15a is shown in FIG. 2.

It is known in the prior art for each hub plate to lie in a plane parallel to the associated blade bearing and thus orthogonal to the pitch axis 19 (FIG. 1). However, the pitch axis 19 of the downwardly-hanging blade may depart significantly from the vertical: individually and especially in combination, the inclined rotor axis 18 and the cone angle tend to tilt the pitch axis 19 of that downwardly-hanging blade in the upwind direction, away from the tower 11, as shown in FIG. 1. Consequently, a hub plate may be inclined too far from the horizontal to make an ideal work platform.

SUMMARY OF THE INVENTION

Against this background, the invention resides in a wind turbine comprising: a tower; a nacelle mounted to the top of the tower; a rotor mounted to the nacelle, the rotor comprising two or more blades mounted to a central hub, the hub supporting two or more annular pitch bearings associated respectively with the two or more blades, each pitch bearing defining a bearing plane inclined at a first angle with respect to a horizontal plane when the respective blade is oriented in a downwardly direction in alignment with the tower, wherein: each pitch bearing is spanned by a hub plate; and a work platform integral with or mounted to the hub plate lies generally in a plane at a second angle to the horizontal plane when the respective blade is oriented in a downwardly direction in alignment with the tower, which second angle is less than the first angle.

The plane of the work platform is preferably substantially parallel to the horizontal plane. However, angles of up to approximately seven degrees may be acceptable. In a particular embodiment described in detail later, the work platform is inclined at approximately five degrees to the horizontal. Angles between zero and five degrees are considered preferable. When the wind turbine blade is parked in a downwardly direction in alignment with the tower, the work platform provides a convenient platform for maintenance personnel to use when installing or servicing components in or around the hub. The work platform preferably includes one or more manholes for providing access between the hub and the blade.

The rotor axis of the wind turbine is typically inclined upwardly relative to the horizontal plane by an angle of approximately eleven degrees. In order to be substantially horizontal when the blade is parked in a downwardly direction (as shown in FIG. 2), the work platform may be suitably inclined inwardly with respect to the hub moving parallel to the rotor axis in a direction from the hub towards the nacelle.

The hub plate preferably comprises a substantially circular outer flange for connecting the hub plate to the hub. The outer flange suitably lies in a plane parallel to the bearing plane. Accordingly, the work platform is inclined relative to the plane of the outer flange. In preferred embodiments of the invention, the outer flange is mounted between the hub and the pitch bearing. The pitch bearing preferably comprises an inner ring and an outer ring and the outer flange is preferably mounted to the inner ring. Accordingly, the blade is preferably mounted to the outer ring. It will however be appreciated that the hub plate may be mounted to the outer ring and the blade mounted to the inner ring in other embodiments.

The hub plate may comprise a peripheral sidewall between the work platform and the outer flange. The profile of the sidewall preferably varies about the periphery of the work platform in accordance with the inclination of the work platform relative to the outer flange. In a preferred embodiment of the invention, the peripheral sidewall extends generally towards the rotor blade on an inboard side of the work platform nearest the nacelle and extends generally towards the hub on an outboard side of the platform furthest from the nacelle. This configuration can advantageously result in a relatively compact configuration because it allows the work platform to be contained largely within a cylindrical region defined by an inner circumference of the pitch bearing.

Preferably a majority of the work platform is contained within a cylindrical space defined by an inner circumference of the annular pitch bearing and bound by a pair of opposed planes defined respectively by upper and lower faces of the annular pitch bearing. For the avoidance of doubt, 'a majority' of the work platform may include all of the work platform.

The inventive concept includes a wind farm comprising a plurality of wind turbines as described above.

The inventive concept also includes a hub plate for a wind turbine, the hub plate comprising: a work platform defining a first plane; and a substantially circular outer flange at least partially surrounding the work platform, the outer flange defining a second plane and providing a means for mounting the hub plate to a hub of the wind turbine at an interface between the hub and a rotor blade; wherein the first plane is inclined relative to the second plane. Optional features of the invention as described above also apply to the invention when expressed in these terms, and so are not repeated herein.

Figure 3:
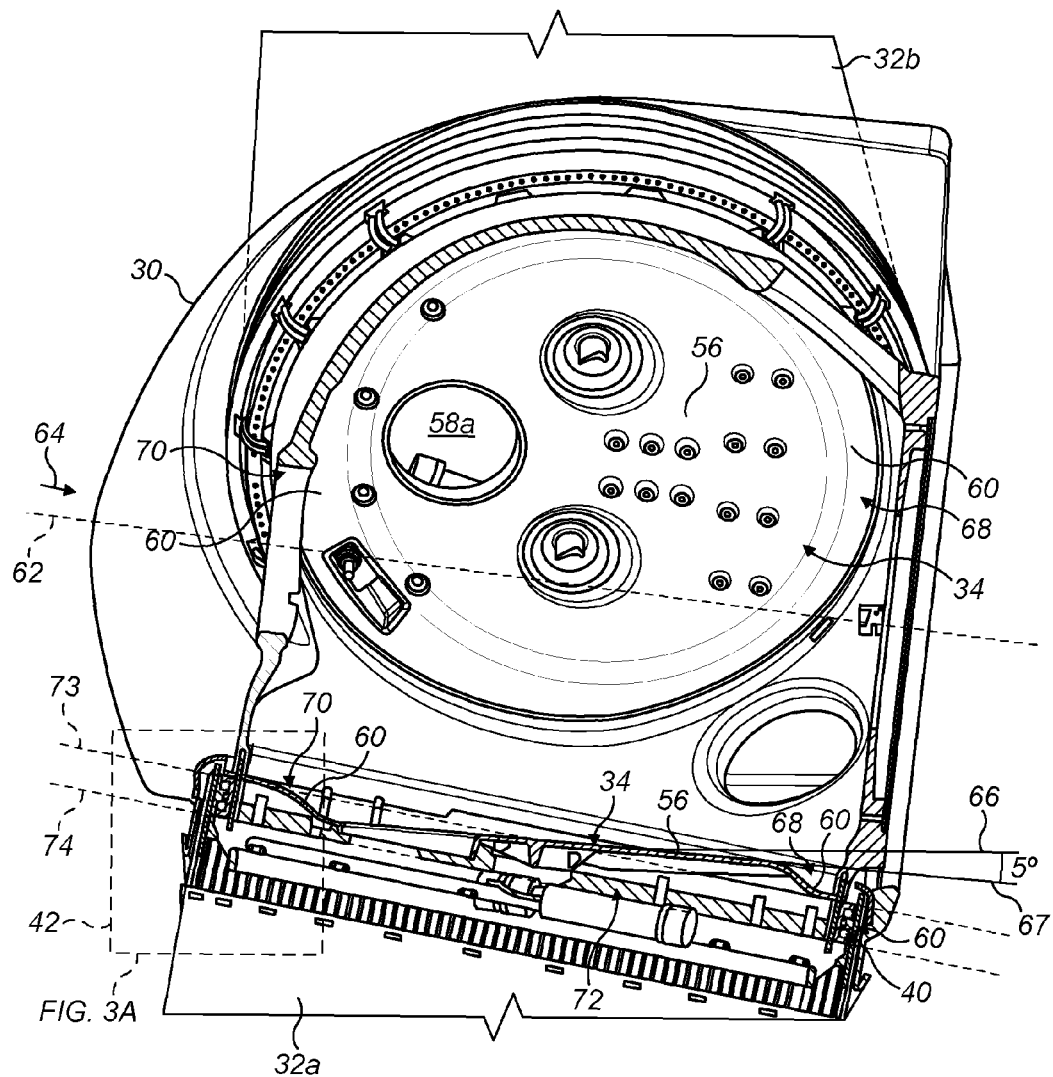
Figure 3A:
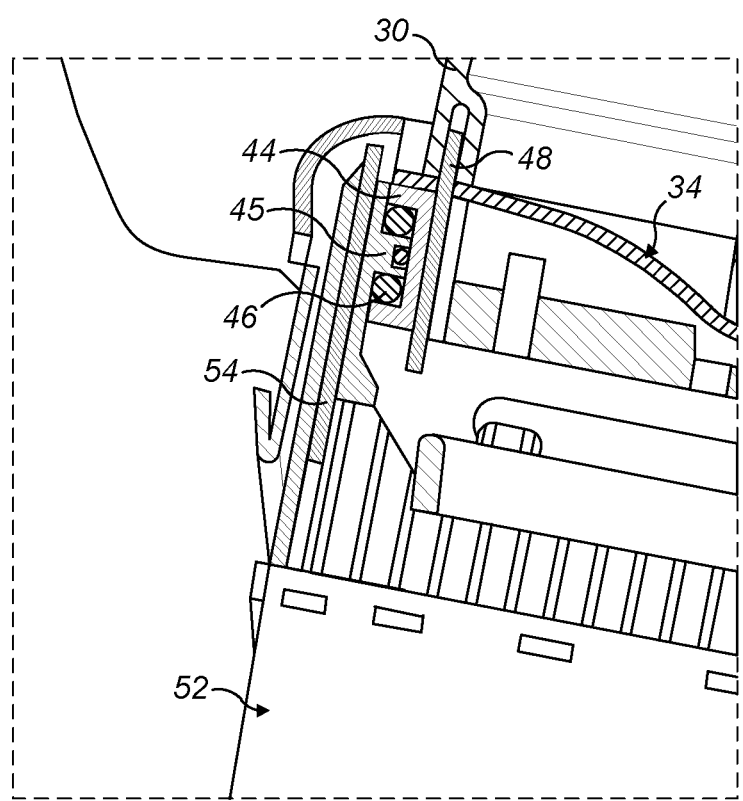
Figure 4:
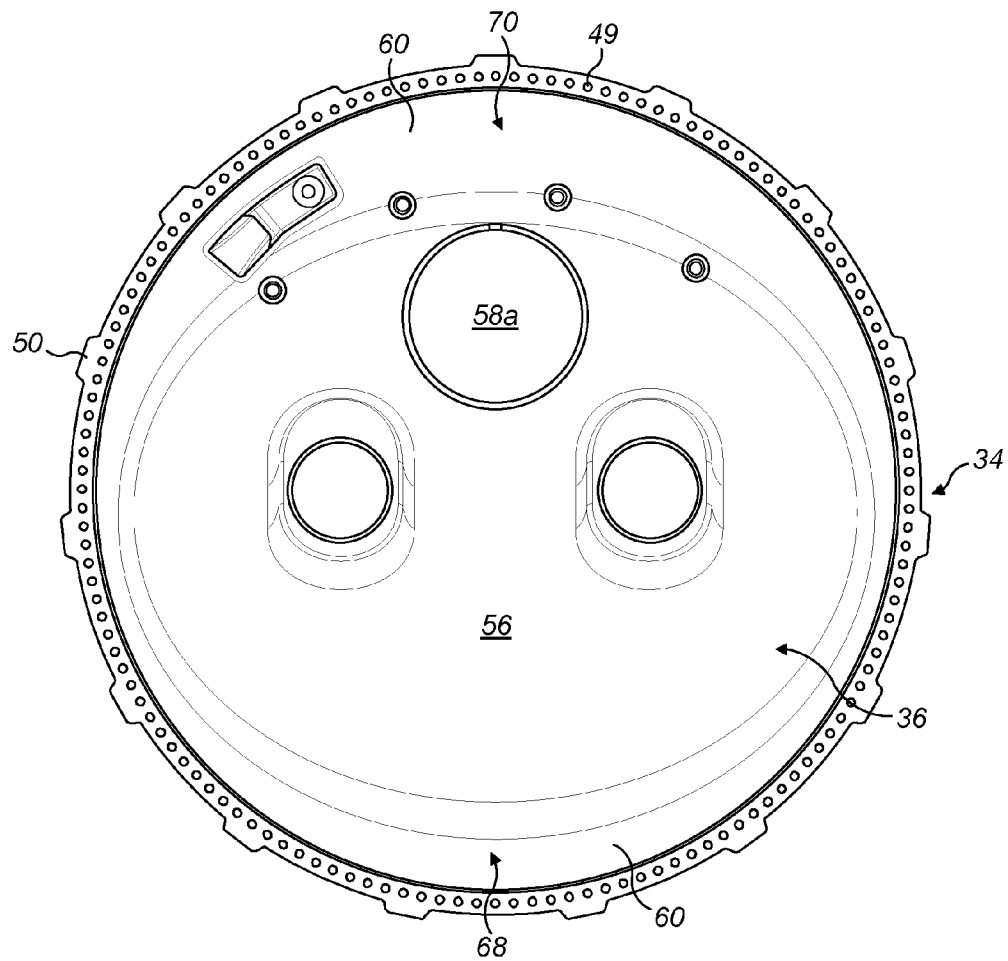
Figure 5:
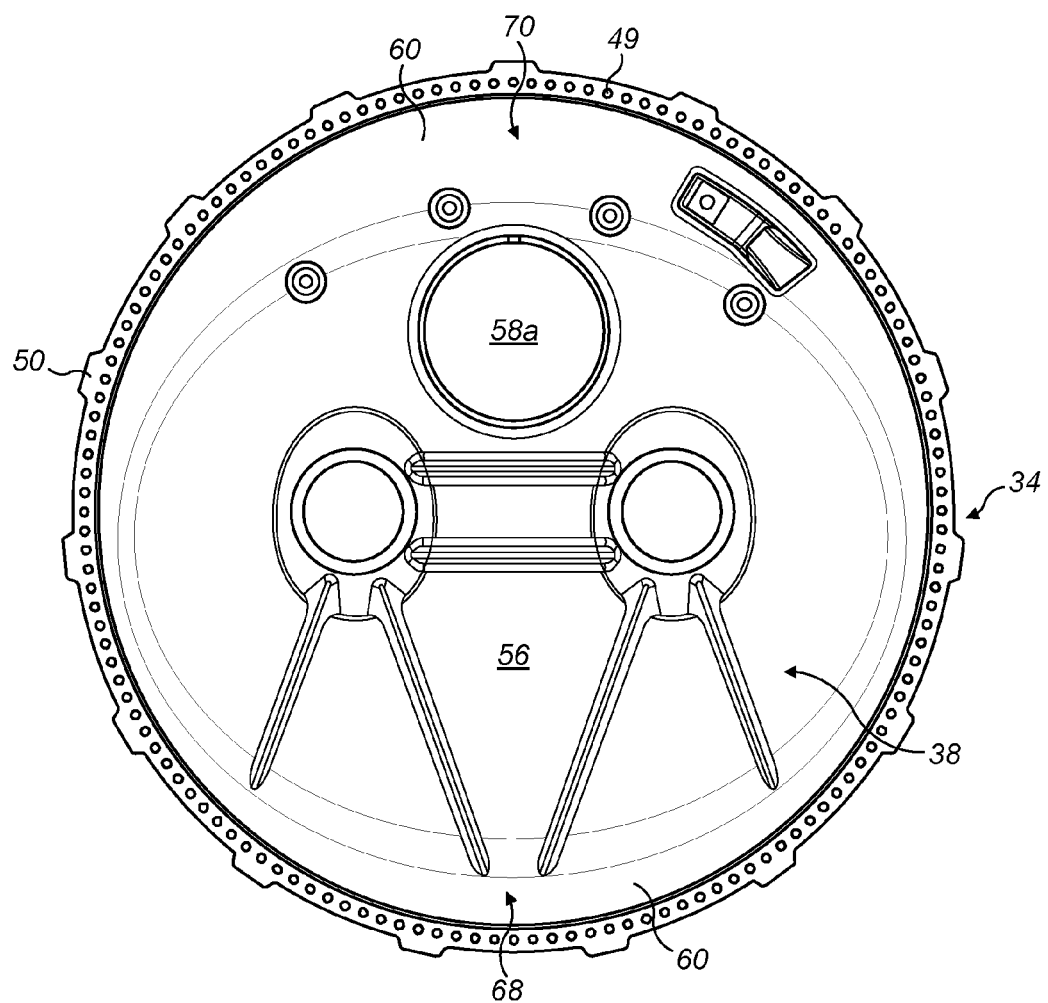

In order that the invention may be more readily understood, reference will now be made, by way of non-limiting example only, to the following drawings, in which:

FIG. 3 is a partial cross-section through a hub of a wind turbine according to the present invention, showing hub plates connected between the hub and respective wind turbine blades;

FIG. 3A is an enlarged view of the part of FIG. 3 within the dashed box in FIG. 3;

FIG. 4 is a front view of one of the hub plates shown in FIG. 3;

FIG. 5 is a rear view of the hub plate of FIG. 4; and

Figure 6:
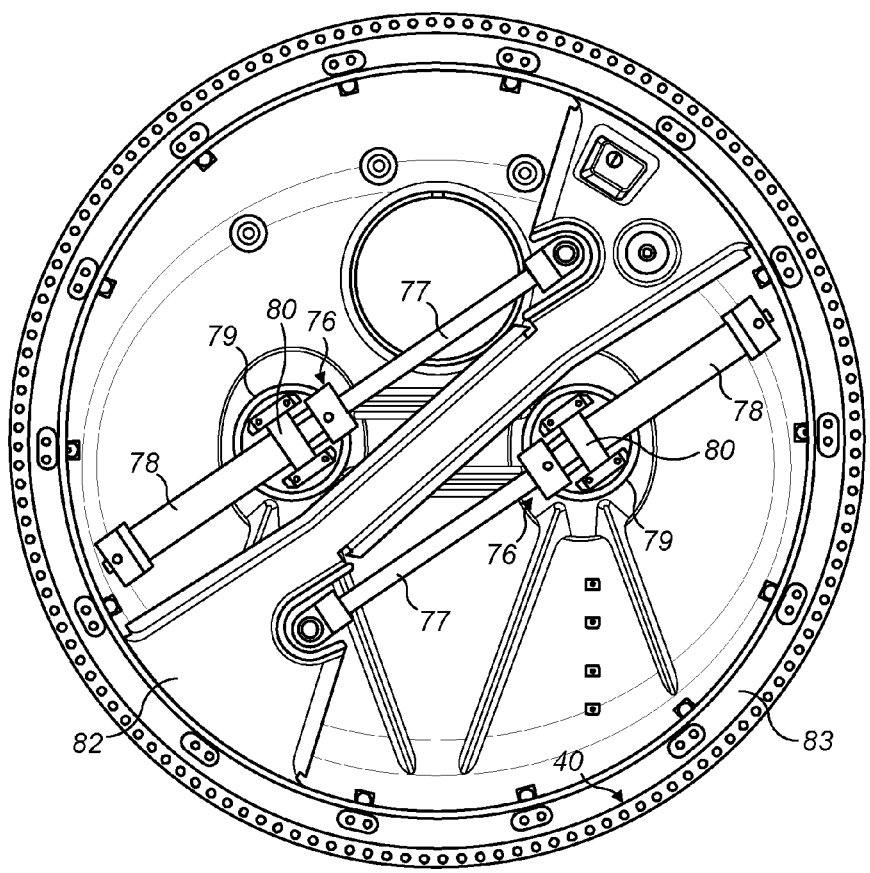

FIG. 6 shows a pitch bearing and elements of a hydraulic pitch mechanism mounted to the hub plate.

DETAILED DESCRIPTION

Referring initially to FIG. 3, which shows a hub 30 of a wind turbine according to the present invention, three blades are connected to the hub 30, but only two blades 32a and 32b are visible in the partial cross-sectional view of FIG. 3. Hub plates 34, in the form of stiffening bulkheads, are mounted at the interface between the hub 30 and the respective blades 32a, 32b. The hub plates 34 are generally circular and have a front face 36 that faces the hub 30 and a rear face 38 that faces the respective blade 32a, 32b. The front face 36 is shown more clearly in FIG. 4 and the rear face 38 is shown more clearly in FIG. 5.

Referring to the lower blade 32a shown in FIG. 3, an annular pitch bearing 40 is mounted between the hub plate 34 and the blade 32a. Whilst not shown in FIG. 3, a similar pitch bearing is provided between the respective hub plates and blades of the other two blades. The pitch bearing 40 is shown more clearly in FIG. 3A, which is an enlarged view of the part of FIG. 3 within the dashed box 42.

Referring to FIG. 3A, the pitch bearing 40 comprises an inner ring 44 and an outer ring 45, with two series of balls 46 provided in-between. The hub plate 34 is mounted between the hub 30 and the inner ring 44, and this assembly is fixed in place by a plurality of bolts 48 and associated nuts. The bolts 48 are received in a series of circularly arranged, and mutually aligned holes 49 provided in the hub 30, the hub plate 34 and the inner ring 44 respectively. The series of holes 49 in the hub plate 34 are provided in a circular outer flange 50 of the hub plate 34, as shown more clearly in FIGS. 4 and 5. Referring still to FIG. 3A, a root end 52 of the blade 32a is secured to the outer ring 45 of the pitch bearing 40 by a plurality of pins/bolts 54, which are received in a series of circularly arranged, and mutually aligned holes provided in the root end 52 of the blade 32a and the outer ring 45 of the pitch bearing 40.

Referring to FIGS. 3 to 5, the hub plate 34 comprises a central, substantially circular and flat work platform 56. The work platform 56 includes a manhole 58a, which provide service access to the interior of the hub 30 or blade 32a for maintenance personnel. The work platform 56 is surrounded by a circumferential sidewall 60. The circumferential sidewall 60 extends between the work platform 56 and the outer circular flange 50 of the hub plate 34, as shown best in FIGS. 4 and 5. The work platform 56 and the outer circular flange 50 are formed as a single casting of steel.

The work platform 56 of the hub plate 34 in this example is inclined relative to the plane of the outer circular flange 50, and hence is inclined relative to the plane of the pitch bearing 40 in order that the work platform 56 is substantially horizontal when the blade 32a is parked in a substantially downward direction, parallel to the tower, as shown in FIG. 3. Specifically, the work platform 56 is inclined inwardly with respect to hollow interior of the hub 30 moving parallel to the rotor axis 62 in a direction from the hub 30 towards the nacelle (not shown), as indicated by the arrow 64 in FIG. 3.

In this example, the hub plate 34 is arranged such that the work platform 56 is inclined at approximately five degrees to a horizontal plane 66, as represented by the line 67, when the blade 32a is parked in this position. This level of inclination is considered to be substantially horizontal, and provides a sufficiently level surface for maintenance personnel to stand on when installing or servicing nearby components, such as components of the pitch mechanism.

The rotor axis 62 is typically inclined at about eleven degrees to the horizontal, so ignoring any additional inclination due to cone angle, it will be appreciated that the work platform 56 of the hub plate 34 is significantly less inclined relative to the horizontal than prior art hub plates, which are arranged in the plane of the pitch bearing 40, and hence are inclined to the horizontal at least by the same amount as the rotor axis 62 when the blade 32a is downwardly extending.

Figure 1:
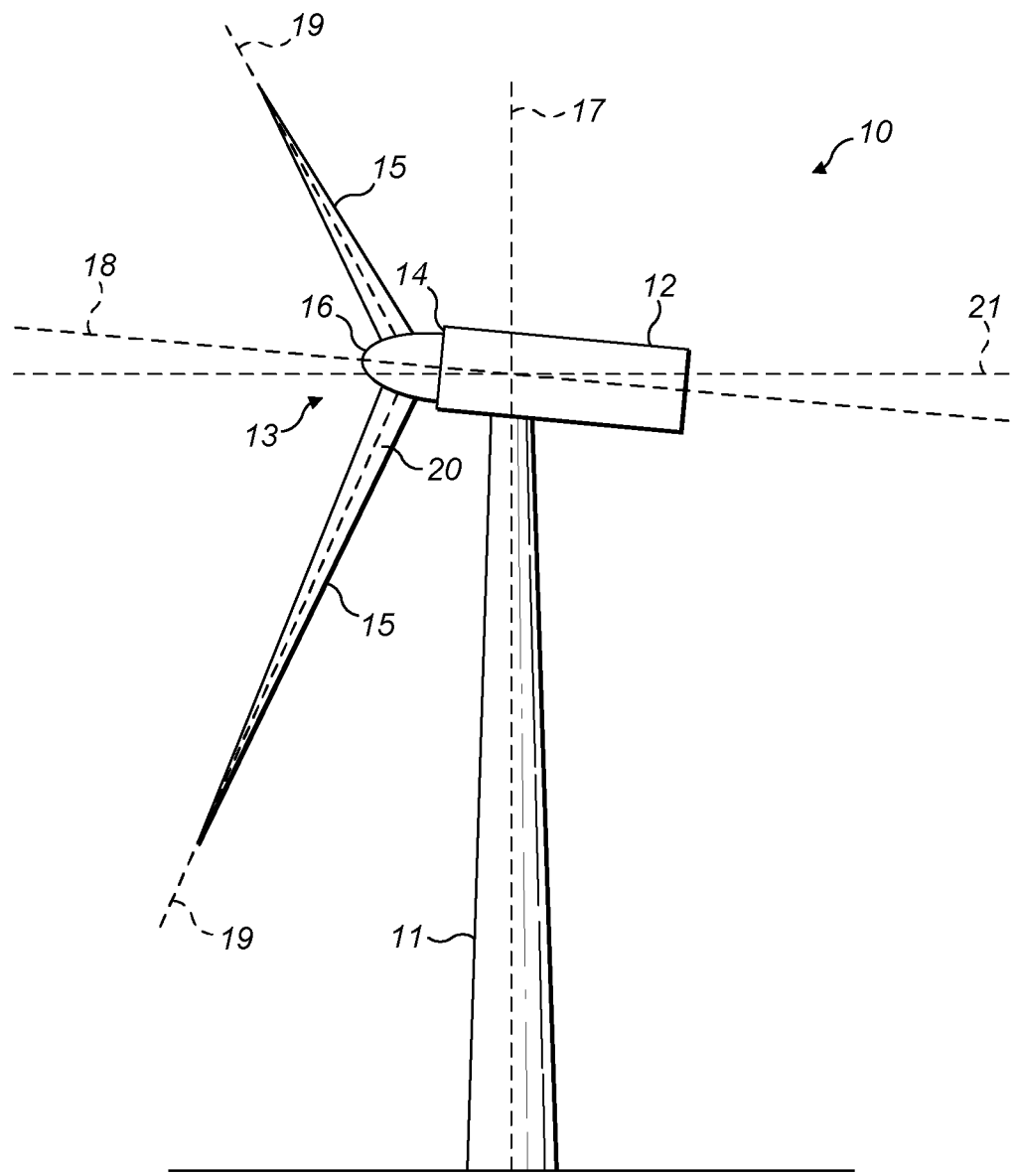
FIGS. 1 and 2, which are, respectively, schematic side and front views of a wind turbine, have already been described above by way of background to the invention.
Figure 2:
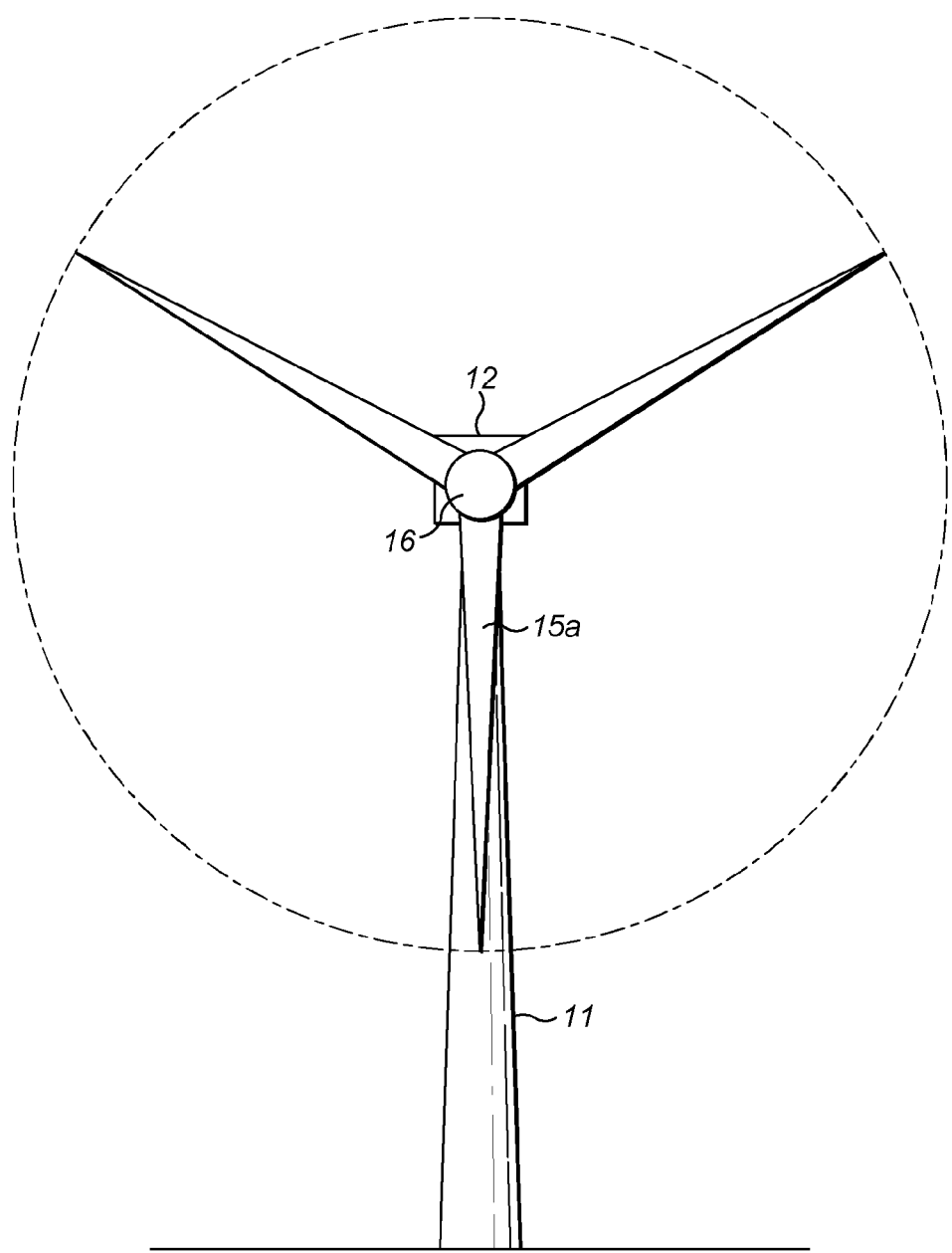

The profile of the circumferential sidewall 60 varies about the periphery of the work platform 56 in accordance with the inclination of the work platform 56 relative to the plane of the circular outer flange 50. In this example, at an inboard side 68 of the hub plate 34, the sidewall 60 extends generally upwards from the rear face 38 (FIG. 5) of the hub plate 34, i.e. generally towards the blade 32a, 32b, whilst at an outboard side 70 of the hub plate 34, the sidewall 50 extends generally upwards from the front face 36 (FIG. 4) of the hub plate 34, i.e. towards the hub 30. The terms 'inboard' and 'outboard' are to be understood with respect to a generally vertical yaw axis 17 between the nacelle and the tower, as shown in FIG. 1. This configuration is advantageous because it results in a relatively compact hub plate 34, with a majority of the work platform 56 being accommodated within a cylindrical space 72 defined by an inner circumference of the annular pitch bearing 40 and bound by a pair of opposed planes 73, 74 defined respectively by upper and lower faces of the annular pitch bearing 40, as shown in FIG. 3.

Referring to FIG. 6, this shows the pitch bearing 40 mounted to the circular outer flange 50 (FIG. 5) of the hub plate 34. FIG. 6 also shows a pair of hydraulic actuators 76 of the pitch mechanism. The actuators 76 each include a piston 77 and a cylinder 78. The cylinders 78 of the respective actuators 76 are attached to mounting points 79 on the hub plate 34 respectively via a pair of brackets 80. The respective pistons 77 are connected to a crossbar 82 of a coupling ring 83, to which the blade 32a is attached. As is known in the art, the blade 32a is caused to turn about its pitch axis by extending one of the pistons 77 relative to its cylinder 78 and lengthening the other piston 77 relative to its cylinder 78.

Various modifications may be made to the present invention without departing from the scope of the invention as defined by the following claims. For example, it will be appreciated that the sidewall 60 of the hub plate 34 may be configured differently in other embodiments. For example, at the outboard side 70 of the hub plate 34 the sidewall 60 could be very shallow or non-existent. This would require the sidewall 60 at the inboard side 68 of the hub plate 34 to be deeper. This in turn would result in the work platform 56 protruding significantly from the inner cylindrical space 72 defined by the pitch bearing 40.

Whilst in the present invention the work platform 56 also serves as a stiffening bulkhead, in yet further embodiments a separate work platform may be attached to the hub plate. In such examples, the hub plate may resemble a prior art hub plate, i.e. in which the plate is substantially parallel to the plane of the pitch bearing, but this hub plate could have an additional work platform attached, which is configured to be substantially horizontal when the blade is parked downwardly.

The invention claimed is:

1. A wind turbine comprising:
   a tower;
   a nacelle mounted to the top of the tower;
   a rotor mounted to the nacelle, the rotor comprising two or more blades mounted to a central hub, the hub supporting two or more annular pitch bearings associated respectively with the two or more blades, each pitch bearing defining a bearing plane inclined at a first angle with respect to a horizontal plane when the respective blade is oriented in a downwardly direction in alignment with the tower, wherein: each pitch bearing is spanned by a hub plate; and a work platform integral with or mounted to the hub plate lies generally in a plane at a second angle to the horizontal plane when the respective blade is oriented in a downwardly direction in alignment with the tower, which second angle is less than the first angle.

2. The wind turbine as claimed in claim 1, wherein the plane of the work platform lies substantially parallel to the horizontal plane.

3. The wind turbine as claimed in claim 1, wherein the second angle is approximately five degrees or less.

4. The wind turbine as claimed in claim 1, wherein the work platform is inclined inwardly with respect to the hub moving parallel to a rotor axis of the wind turbine in a direction from the hub towards the nacelle.

5. The wind turbine as claimed in claim 1, wherein the hub plate comprises a substantially circular outer flange for connecting the hub plate to the hub, the outer flange lying in a plane parallel to the bearing plane.

6. The wind turbine as claimed in claim 5, wherein the outer flange is mounted between the hub and the pitch bearing.

7. The wind turbine as claimed in claim 6, wherein the pitch bearing comprises an inner ring and an outer ring and the outer flange is mounted to the inner ring.

8. The wind turbine as claimed in claim 5, wherein the hub plate comprises a peripheral sidewall between the work platform and the outer flange.

9. The wind turbine as claimed in claim 8, wherein the profile of the sidewall varies about the periphery of the work platform in accordance with the inclination of the work platform relative to the outer flange.

10. The wind turbine as claimed in claim 9, wherein the peripheral sidewall extends towards the rotor blade on an inboard side of the work platform nearest the nacelle and extends towards the hub on an outboard side of the platform furthest from the nacelle.

11. The wind turbine as claimed in claim 1, wherein a majority of the work platform is contained within a cylindrical space defined by an inner circumference of the annular pitch bearing and bound by a pair of opposed planes defined respectively by upper and lower faces of the annular pitch bearing.

12. A wind farm comprising a plurality of wind turbines as claimed in claim 1.

13. A hub plate for a wind turbine, the hub plate comprising:
   a work platform defining a first plane; and
   a substantially circular outer flange at least partially surrounding the work platform, the outer flange defining a second plane and providing a means for mounting the hub plate to a hub of the wind turbine at an interface between the hub and a rotor blade;
   wherein the first plane is inclined relative to the second plane.

14. A hub for a wind turbine comprising a hub plate as claimed in claim 13.

15. A wind turbine comprising a hub as claimed in claim 14.

* * * * *